Feb. 7, 1939.     D. P. HYNES     2,146,187
HOOD LATCH
Original Filed Sept. 3, 1937    2 Sheets-Sheet 1
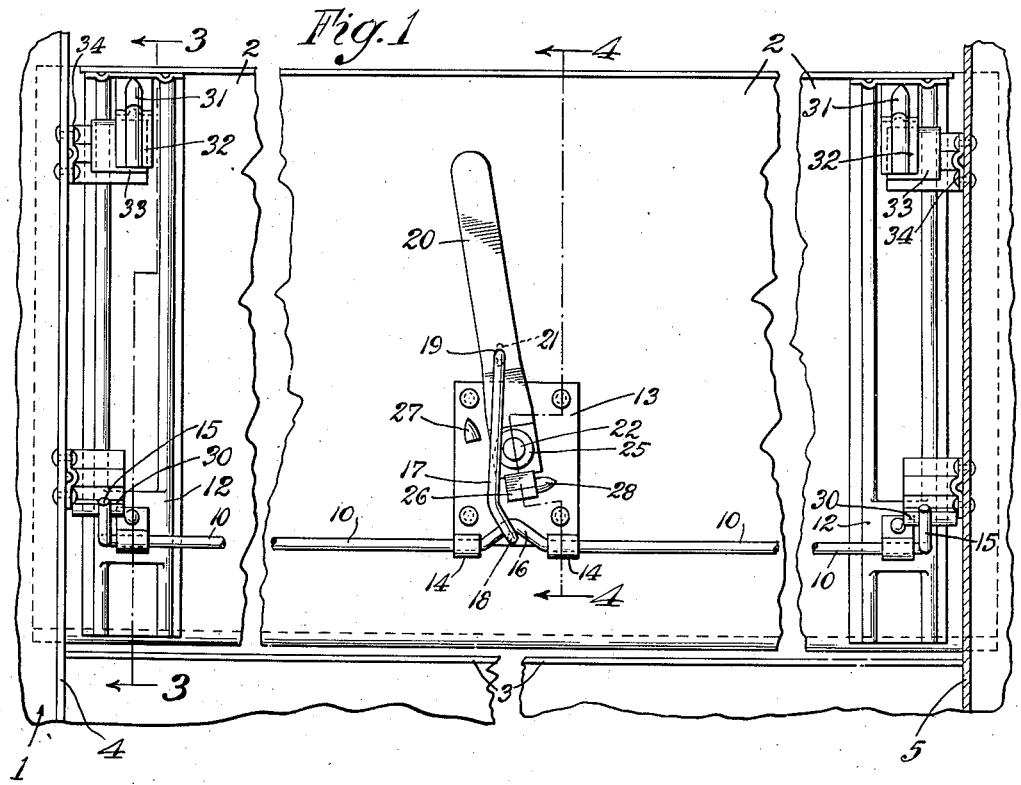
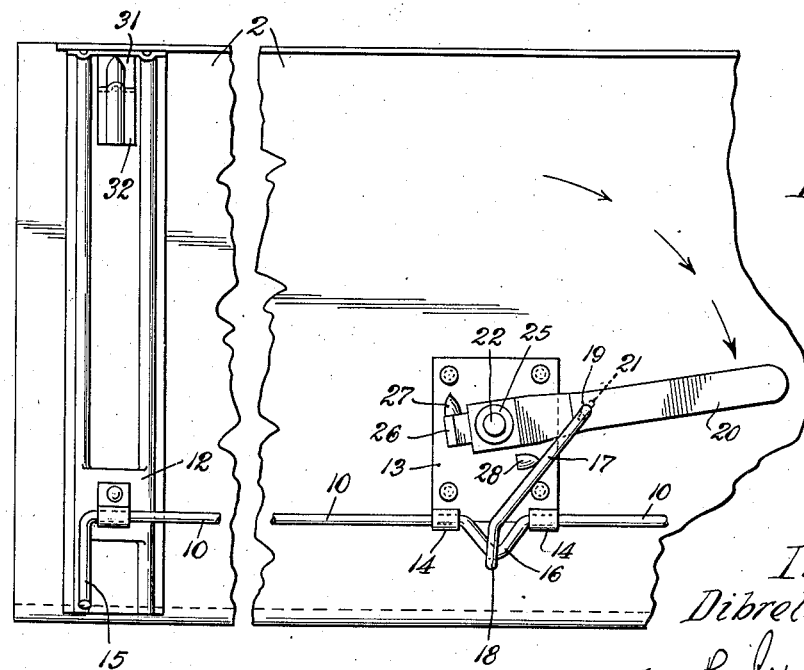
Inventor
Dibrell P. Hynes Feb. 7, 1939.  D. P. HYNES  2,146,187
HOOD LATCH
Original Filed Sept. 3, 1937  2 Sheets—Sheet 2
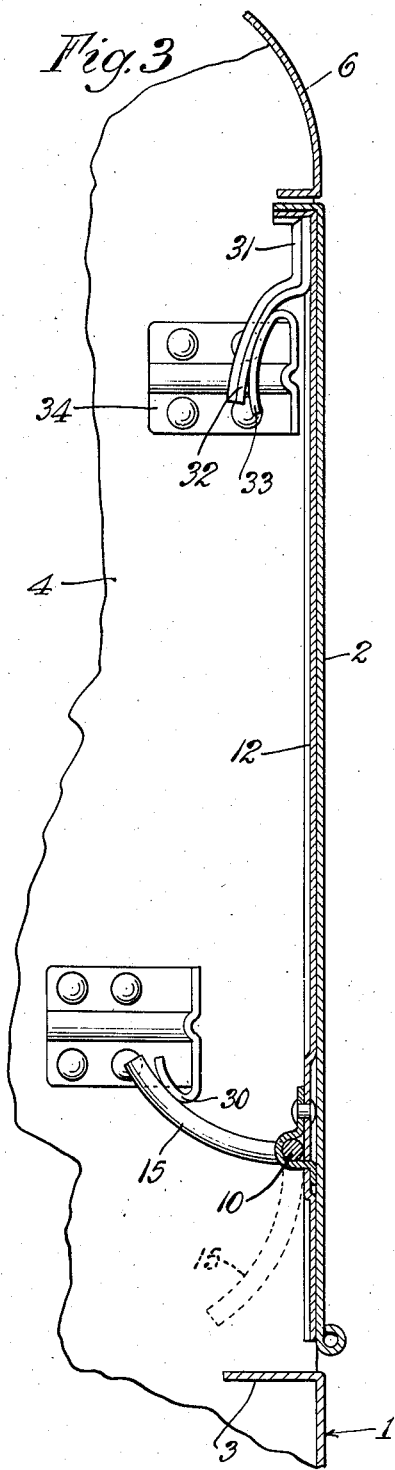
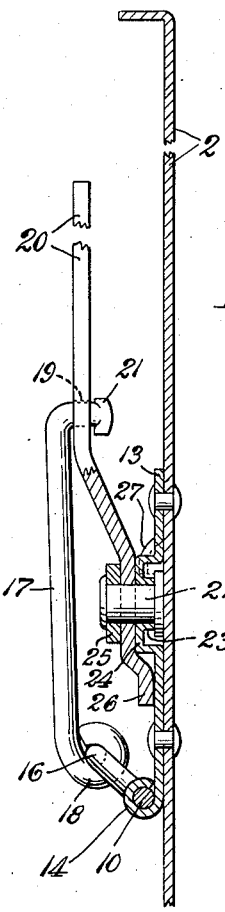
Inventor
Dibrell P. Hynes
by Parker & Carter
Attorneys Patented Feb. 7, 1939

2,146,187

UNITED STATES PATENT OFFICE 2,146,187

HOOD LATCH

Dibrell P. Hynes, Evanston, Ill., assignor to Chicago Forging & Manufacturing Co., Chicago, Ill., a corporation of Illinois Original application September 3, 1937, Serial No. 162,308. Divided and this application April 8, 1938, Serial No. 200,847

8 Claims. (Cl. 292—217)

My invention relates to an improvement in closing means and latch securing means for automobile hoods.

One purpose is the provision of improved hood closing or latching means applicable primarily for employment with hoods of the type in which the side panel is normally fixed and a top panel or closure is moved downwardly against or above the upper edge of the side panel.

Another purpose is the provision of improved means for normally holding the side panel in position which permits its removal when desired.

Other objects will appear from time to time in the course of the specification and claims.

The present application is a division of my copending application Serial No. 162,308, which was filed September 3, 1937.

I illustrate my invention more or less diagrammatically in the accompanying drawings wherein:

Figure 1 is an inside view illustrating the interior of a removable automobile hood closure panel;

Figure 2 is a partial view of the same structure;

Figure 3 is an enlarged section on the line 3—3 of Figure 1; and

Figure 4 is an enlarged section on the line 4—4 of Figure 1.

Like parts are indicated by like symbols throughout the specification and drawings.

Referring to the drawings, 1 generally indicates a normally fixed portion of the body of a vehicle and 2 is a normally fixed side panel member or automobile hood closure member which may abut or approach at its bottom the vehicle frame indicated at 3 and at its side abutments 4, 5 which may be part, for example, of the radiator frame or portions of the chassis of the vehicle.

6 generally indicates any suitable hinged upper closure member, the details of which do not form part of the present invention. It will be understood, however, that in general access to the interior of the hood may be obtained by raising or moving the top closure 6 rather than the normally fixed side panel or closure 2. It may become necessary, however, to have access to the side of the motor or the like and for that reason it is desirable to have the side panels removable. I illustrate, therefore, the rock shaft 10 which may be mounted on any suitable bearings, positioned upon any suitable reinforcing members 12 at opposite ends to the side panel 2.

I also provide a central base plate 13 formed with additional bearings 14 for the shaft 10. The shaft 10 is provided at its ends with locking cranks or levers 15. Intermediate its ends and between the bearings 14 it has a crank offset 16 which may be surrounded by the eye 18 of the link 17. The opposite end of the link may be turned or upset and may pass through the aperture 19 of the handle lever 20. It may be upset as at 21 in order to hold it in position and to prevent unintended escape.

The handle 20 is provided with a pivot 22 which passes through a bearing 23 formed in an upset portion 24 from the plate 13. 25 is any suitable washer. The toe 26 of the handle 20 has its arc of movement limited by stops 27 and 28 formed in the plate 13, which in the present instance are so positioned as to limit the handle to an arc of about 90 degrees. The specific arc, however, as well as the details of construction of the locking device, may be varied.

When the handle 20 is in the locking position in which it is shown in Figure 1, over center, it rests against the stop 28 and is kept against the stop 28 by the flexure of the shaft 10 and its associated portions. When the handle is locked in such position, the locking end cranks 15 engage any suitable internally positioned locking abutments 30 in a camming locking relationship such as is shown in Figure 3. They tend thereby to draw the lower edge of the panel downwardly as well as inwardly.

At the same time an upper hook 31, which may be secured to or may form part of a reinforcing member 12, has a lock portion 32 extending over an abutment 33 which is mounted in any suitable bracket or base portion 34. As shown in the drawings, the handle 20 is within the panel 2 and is therefore concealed from the exterior. It does not provide ready means for moving the handle from the exterior, but when the top closure 6 has ben lifted the operator can readily grasp the upper end of the handle 20 and release the crank 15 and the associated locking members. Any suitable means may be employed for securing the upper closure 6 in place and when it is secured in place the side panel 2 cannot be removed.

It will be understood that a wide variety of handles also may be employed, but the one illustrated is practical. Note also that the upper hook 31, in its engagement with the abutment 33, has a wedging locking action as the panel 2 is drawn down by the locking cranks 15. The result is a very firm and rattle-proof positioning of the member 2 in place.

It will be realized that whereas I have described and shown a practical and operative device, nevertheless many changes may be made in the size, shape, number and disposition of parts without departing from the spirit of my invention. I therefore wish my drawings and description to be taken as in a broad sense illustrative and diagrammatic rather than as limiting me to the precise structure herein described and shown.

I claim:

1. In closure means for automobiles and the like, a bodily movable side panel, means for holding it in generally upright position, and a locking connection between said panel and the automobile, including downwardly and inwardly inclined members associated directly with the panel, abutments mounted on the automobile within the panel and adapted for engagement with said downwardly and inwardly inclined members, and means for moving said panel downwardly, whereby it is urged inwardly by the engagement of said downwardly and inwardly inclined projections with said abutments.

2. In closure means for automobiles and the like, a bodily movable side panel, means for holding it in generally upright position, a locking connection between said panel and the automobile, including downwardly and inwardly inclined members associated directly with the panel, abutments mounted on the automobile within the panel and adapted for engagement with said downwardly and inwardly inclined members, and means for moving said panel downwardly, whereby it is urged inwardly by the engagement of said downwardly and inwardly inclined projections with said abutments, including a rock shaft rotatably mounted on the inner face of said panel, locking cranks on said rock shaft, additional abutments within the panel and on the automobile, opposed to said locking cranks, and means for rotating said rock shaft.

3. In closure means for automobiles and the like, a bodily movable side panel, means for holding it in generally upright position, a locking connection between said panel and the automobile, including downwardly and inwardly inclined members associated directly with the panel, abutments mounted on the automobile within the panel and adapted for engagement with said downwardly and inwardly inclined members, and means for moving said panel downwardly, whereby it is urged inwardly by the engagement of said downwardly and inwardly inclined projections with said abutments, including a rock shaft rotatably mounted on the inner face of said panel, locking cranks on said rock shaft, additional abutments within the panel and on the automobile, opposed to said locking cranks, and means for rotating said rock shaft, including a handle positioned on the inner face of said panel and an actuating connection between said handle and rock shaft.

4. In closure means for automobiles and the like, a bodily movable side panel, means for holding it in generally upright position, and a locking connection between said panel and the automobile, including downwardly and inwardly inclined members associated directly with the panel, abutments mounted on the automobile within the panel and adapted for engagement with said downwardly and inwardly inclined members, means for moving said panel downwardly, whereby it is urged inwardly by the engagement of said downwardly and inwardly inclined projections with said abutments, and an actuating handle therefor, positioned within said panel.

5. In closure means for automobiles and the like, a bodily movable side panel, means for holding it in generally upright position, and a locking connection between said panel and the automobile, including means interposed between the automobile and the panel adapted to bias the panel to downward and inward movement in response to downward movement of the panel, and additional means for imparting downward movement to the panel.

6. In closure means for automobiles and the like, a bodily movable side panel, means for holding it in generally upright position, and a locking connection between said panel and the automobile, including means interposed between the automobile and the panel adapted to bias the panel to downward and inward movement in response to downward movement of the panel, and additional means for imparting downward movement to the panel, said additional means including an abutment on said automobile and a movable member mounted on said panel, said member being adapted, when moved, to draw the adjacent portion of the panel downwardly and inwardly in relation to the automobile, and means for imparting movement thereto.

7. In closure means for automobiles and the like, a bodily movable side panel, means for holding it in generally upright position, and a locking connection between an upper portion of said panel and the automobile, including means interposed between the automobile and the panel adapted to bias the panel to downward and inward movement in response to downward movement of the panel, and additional means for imparting downward movement to the panel, said additional means including an abutment on said automobile and a movable member mounted on a lower portion of said panel, said member being adapted, when moved, to draw the adjacent lower portion of the panel downwardly and inwardly in relation to the automobile, and means for imparting movement thereto.

8. In closure means for automobiles and the like, a bodily movable side panel, means for holding it in generally upright position, and a locking connection between an upper portion of said panel and the automobile, including means interposed between the automobile and the panel adapted to bias the panel to downward and inward movement in response to downward movement of the panel, and additional means for imparting downward movement to the panel, said additional means including an abutment on said automobile and a movable member mounted on a lower portion of said panel, said member being adapted, when moved, to draw the adjacent lower portion of the panel downwardly and inwardly in relation to the automobile, and means for imparting movement thereto, including a handle located on the inner face of the movable side panel.

DIBRELL P. HYNES.